United States Patent [19]

Richardson et al.

[11] Patent Number: 4,603,193

[45] Date of Patent: Jul. 29, 1986

[54] POLYCONDENSATION PROCESS WITH AEROSOL MIST OF AQUEOUS SOLUTION OF REACTANT SALTS

[75] Inventors: Joel A. Richardson, Naperville; Wassily Poppe, Lombard; Benjamin A. Bolton; Edward E. Paschke, both of Wheaton, all of Ill.

[73] Assignee: Amoco Corporation, Chicago, Ill.

[21] Appl. No.: 582,963

[22] Filed: Feb. 23, 1984

Related U.S. Application Data

[62] Division of Ser. No. 466,904, Feb. 16, 1983, abandoned.

[51] Int. Cl.$^4$ .................... C08G 69/28; C08G 73/10; C08G 73/14
[52] U.S. Cl. .................... 528/342; 528/183; 528/188; 528/189; 528/335; 528/338; 528/339; 528/347; 528/349; 528/350; 528/353
[58] Field of Search ............... 528/342, 350, 353, 183, 528/188, 189

[56] References Cited

U.S. PATENT DOCUMENTS

| | | | |
|---|---|---|---|
| 3,904,577 | 9/1975 | Buisson | 528/342 |
| 3,984,375 | 10/1976 | Frost | 528/342 |
| 4,313,868 | 2/1982 | Hanson | 528/342 |

FOREIGN PATENT DOCUMENTS 1208476 10/1970 United Kingdom .

*Primary Examiner*—Harold D. Anderson

*Attorney, Agent, or Firm*—Stephen L. Hensley; William T. McClain; William H. Magidson

[57] ABSTRACT

A process for the manufacture of polyamides, polyamide-imides and polyimides which process comprises preparing a salt of an aliphatic or aromatic diamine or a mixture of these and di, tri or tetracarboxylic acid or mixture of these or their corresponding anhydride by reacting both feedstocks at a temperature of about 300° to 500° F. in a solvent medium provided the water content of the resulting solution is below 25% water by weight the resulting salt solution is subjected to a pressure of about 1500–3000 psig and is then passed through a preheat zone where the temperature is increased to about 625° F., the total residence time is kept at about 25 to about 50 seconds. The reactants are flashed through a control valve or nozzle to give an aerosol mist at a pressure of about 0–400 psig, the polymerization is further carried out in a flash reactor with a high heat flux and with wall temperatures of about 600° F. to about 1000° F. and melt temperatures of about 500° F. to about 750° F., the total polymer residence time in the reactor is kept about 0.1 to about 20 seconds. The novel compositions are useful for engineering resins. Also a process for the manufacture of polyesters, polycarbonates, polyarylates and polyesterarylates by the process disclosed above, except that instead of a salt a prepolymer is prepared and the reactants for polyesters are dicarboxylic acids and glycols, for polycarbonates, diphenols and phosgene, for polyarylates, diphenols and dicarboxylic acids and for polyesterarylates, dicarboxylic acids and phosgene.

14 Claims, No Drawings

POLYCONDENSATION PROCESS WITH AEROSOL MIST OF AQUEOUS SOLUTION OF REACTANT SALTS

This is a division of application Ser. No. 466,904, filed 2/16/83, now abandoned.

BACKGROUND OF THE INVENTION

The field of this invention relates to a polycondensation process for the manufacture of organic polymers from prepolymers or salts using a high temperature system wherein the polymerization is conducted in a steam or vapor stream at melt temperatures in the range of about 350° F. to about 750° F. while the wall temperature of the aerosol jet tube reactor is about 400° F. to about 1000° F. and the total residence time is kept in the range of about 0.1 seconds to about 20 seconds. Our process is suitable for the manufacture of polyesters, polycarbonates, polyarylates, polyesterarylates, polyamides, polyamide-imides and polyimides. Our novel aerojet regime process is applicable to any polycondensation reactor provided the salt or prepolymer is homogeneous and is in a single phase, the salt or prepolymer is stable under the high reaction temperatures and is capable of forming droplets. This means that the salt or prepolymers useful in our novel process atomize easily at the inlet of the jet reactor and thus have a high surface to volume ratio in the reactor.

Our novel aerosol jet process for the manufacture of polyamides, polyamide-imides, polyimides, polyesters, polycarbonates, polyarylates and polyesterarylates is unknown to the prior art, however, we will discuss the most relevant prior art references relating to polyamides.

U.S. Pat. No. 2,361,717 discloses a slug flow tubular reactor, reaction pressures were about 1000 psig in the preheat sections and residence times were 15 to 30 minutes. This is clearly a much slower process than our novel aerosol jet process where the residence times are about 0.1 to about 20 seconds. Another reference of interest may be Canadian Patent No. 527,473 which discloses the use of variable tube diameters to control pressure drop and temperatures. U.S. Pat. No. 3,960,820 discloses a slug flow regime using steam injection to control residence time by pressure control. Other references of interest include U.S. Pat No. 2,689,839 and U.S. Pat. No. 3,357,955 which relate to additive additions or product quality adjustment of polyamides; and U.S. Pat. No. 3,300,449 which discloses a residence time of about 10 to about 120 minutes. U.S. Pat. Nos. 3,193,535 and 3,258,313 disclose a process with a tubular reactor which uses a high water content 47% by weight. In reviewing all these references it is clear that our novel aerosol jet polycondensation process has not been contemplated by the prior art.

The general object of this invention is to provide a novel polycondensation process wherein the polycondensation is carried out in an aerosol jet regime at melt temperatures of about 500° F. to about 750° F. and contact times of about 0.1 seconds to about 20 seconds. A more particular object is to provide a novel condensation process for condensing aromatic carboxylic acids and anhydrides with diamines which are difficult to conduct under methods known to the prior art. Further, objects will be apparent from the description of the invention hereunder.

In our novel process we prepare a salt by reacting an aliphatic or aromatic diamine with di, tri or tetracarboxylic acids or their corresponding anhydrides or mixtures of the various acids or anhydrides. For polyesters, polycarbonates, polyarylates and polyesterarylates we prepare the appropriate prepolymers.

Suitably, in our process for the manufacture of polyamides, polyamide-imides or polyimides, a salt is first produced. This is carried out in any suitably designed stirred reactor. Feed materials are charged into the reactor at a temperature of about 75° F. to about 175° F. Solvent content of the salt solution is maintained at less than 25% by weight, preferably about 13 to about 17% by weight. Temperatures are then raised to provide a homogeneous salt solution. This is usually the range of about 375° F. to about 450° F. As quickly as possible, pressures are allowed to build to the limits of the equipment, usually to about 300 to about 600 psig. The salt prepared as described above is metered through a pump and pressure is increased to about 1500 to about 3000 psig. If additional processing is required to purify or filter the salt solution, the operation is carried out prior to the pump. The resulting salt and prepolymer mix is then heated and flashed through a control valve or nozzle to give an aerosol mist at pressures of about 0 to about 400 psig. The salt and prepolymer mix then is passed through the flash reactor. This reactor is designed to provide a high heat flux to the polymer and has a wall temperature of about 600° F. to about 1000° F. The melt temperature range is about 500° F. to about 750° F. through the flash reactor. The total residence time of the reactants in the flash reactor is about 0.1 to about 20 seconds, preferably about 0.2 to about 10 seconds and varies with the feed rate and pressure which are suitably in the range of about 100 lb/hour inch$^2$ to about 200 lb/hour inch$^2$.

In our process specific mass flow refers to mass flow per unit of reactor cross sectional area. The lower limit is defined by the limits of proper flow velocity through the reactor for the aerosol jet regime as opposed to slug flow. The upper limit is defined by the limits of heat input. When utilizing our process to prepare polyesters from dicarboxylate acids and glycol, polycarbonates from diphenols and phosgene, polyarylates from diphenols and dicarboxylic acids and polyesterarylates from diphenols, dicarboxylic acids and phosgenes we prepare a prepolymer which can suitably be an oligomer, dimer or trimer but must be homogeneous and is in a single phase, is stable under the high reaction temperatures and is capable of atomizing readily at the inlet of the jet reactor. The temperatures and other reaction conditions are the same as set forth hereinabove. Suitable polyesters which are prepared by our process and disclosed by Kirk-Othmer Encyclopedia of Chemical Technology, John Wiley and Sons (1982), pages 531–576, including the references cited therein. All the pages and the references cited therein from the article in Kirk-Othmer are incorporated into this application and made part hereof. Suitable polycarbonates which are prepared by our process are disclosed in the aforementioned Kirk-Othmer Encyclopedia of Chemical Technology, Vol. 18, pages 479 through 494 including the references cited therein and in Chapter 2 of the book, New Linear Polymers by Lee et al, McGraw Hill Book Co. (1967) including the references cited therein. All the pages from both citations are incorporated into this application and made part hereof including the references cited in the Kirk-Othmer article and in Chapter 2 of the Lee et al book. Suitable polyarylates prepared by our process are disclosed in U.S. Pat. Nos. 3,772,389 and 4,302,382 and the references cited therein. Both patents and the references cited therein are incorporated by references into this application and made part hereof.

Suitably, from the flash reactor the polymer is injected directly on to the screws of a twin screw extruder. Residence time in the twin screw extruder is about 45 seconds to about 3 minutes. Other types of finishing reactors are also suitably employed such as disc ring reactors, agitated stranding devolatizers and thin film evaporators.

The advantages of our novel aerosol jet reactor process are that the flow regime in the flash reactor is an aerosol jet and that the residence time after salt preparation is about 76 to about 240 seconds while in the prior art process the residence time is in the range of about 75 to 240 minutes. The maximum melt temperature in our novel process is about 620° F. to about 730° F. while in the prior art processes the range is below 570° F., usually around 390° F. to 450° F. Furthermore, in our process the flow is self-controlling while the prior art processes require special controls. A further advantage of our novel aerosol jet process is that we are able to process high melt viscosity polymers while conventional processes are not able to process high melt viscosity polymers with any confidence.

Suitable di, tri and tetracarboxylic acids useful in our process to manufacture polyamides include terephthalic acid, isophthalic acid, trimellitic acid, 5-tertiary-butylisophthalic acid, adipic acid, azelaic acid, sebacic acid, dodecanedioic acid, bussylic acid and etc. The preferred acids are terephthalic acid, isophthalic acid and adipic acid and mixtures of these.

Suitable anhydrides useful in our process include trimellitic anhydride, pyromellitic dianhydrides, 2, 3, 6, 7-naphthalene tetracarboxylic dianhydride, 3,3', 4,4'-diphenyl tetracarboxylic dianhydride, 1, 2, 5, 6-naphthalene tetracarboxylic dianhydride, 1, 2, 3, 4-cyclopentane tetracarboxylic dianhydride, 2,2', 3,3'-diphenyl tetracarboxylic dianhydride, 2,2-bis(3,4-dicarboxyphenyl)propane dianhydride, 3,4-dicarboxyphenol sulfone dianhydride, 3, 4, 9, 10-perylene tetracarboxylic dianhydride, 2, 3, 4, 5-pyrrolidone tetracarboxylic dianhydride, bis(3,4-dicarboxylphenyl)ether dianhydride; ethylene tetracarboxylic dianhydrides; 3,3', 4,4'-benzophenone tetracarboxylic dianhydrides, bis(3,4-dicarboxylphenyl)sulfide dianhydride, bis(3, 4-dicarboxylphenyl)methane dianhydride, 1, 4, 5, 8-naphthalene tetracarboxylic dianhydride and etc. The preferred tricarboxylic acid anhydride is trimellitic anhydride. It should be understood that tricarboxylic acids and their corresponding anhydrides like trimellitic anhydride are useful for the manufacture of polyamide-imides and tetracarboxylic acids and their corresponding anhydrides are useful for the manufacture of polyimides.

Aliphatic, cycloaliphatic and aromatic diamines useful in our process include the following: hexamethylene diamines, trimethylhexamethylene diamine, ethylenediamine, tetramethylene diamine, octamethylene diamine, nonamethylene diamine, decamethylene diamine, dodecamethylene diamine, 4,4'-diamino(dicyclohexylmethane), xylene diamine. The preferred aliphatic diamines include hexamethylene diamine and trimethylhexamethylene diamines.

Suitable aromatic diamines useful in our process include para- and meta-phenylenediamine, para- and metaxylenediamine, para-toluenediamine, 2,4-toluenediamine, 2,6-toluenediamine, 3,5-toluenediamine, oxybis(aniline), thiobis(aniline,), sulfonylbis(aniline), diaminobenzophenone, methylenebis(aniline), benzidine, 1,5-diaminonaphthalene, oxybis(2-methylaniline), thiobis(2-methylaniline), and the like. Examples of other useful aromatic primary diamines are the following: 2,2'-naphthalene diamine, 2,4'-naphthalene diamine, 2,2'-biphenylene diamine, 3,3'-biphenylene diamine, 4,4'-biphenylene diamine, and the like; 3,3'-dichlorobenzidine, ethylene dianiline (4,4'-diaminodiphenyl ethane), and the like; ketodianiline, 3,3'-diaminodiphenyl sulfide, 4,4'-diaminodiphenyl sulfone, 3,3'-diaminodiphenyl sulfone, hexafluoroisopropylidene-bis(4-phenyl amine), 4,4'-diaminodiphenyl methane, 2,6-diaminopyridine, bis-(4-aminophenyl)-diethyl silane, bis(4-aminophenyl)ethyl phosphine oxide, bis(4-aminophenyl)-N-phenylamine, bis(4-amino-phenyl)-N-methylamine, 3,3'-dimethyl-4,4'-diaminobiphenyl para-bis(2-methyl-4-aminophenyl)-benzene, 3,3'-diaminoadamantane. The preferred aromatic diamine is meta-phenylene diamine.

The preferred process comprises preparing a salt of an aliphatic or aromatic diamine or a mixture of these and di, tri or tetracarboxylic acid, a mixture of these or their corresponding anhydrides by reacting both feedstocks at a temperature of about 375° F. to about 450° F. in an aqueous medium provided the water content of the resulting solution is kept below 25% water by weight. The resulting salt solution is subjected to a pressure of about 1500 to about 3000 psig and is then passed through a preheat zone where the temperature is increased from about 425° F. to about 625° F., the total residence time is kept about 25 to about 50 seconds, the reactants then are flashed through a control valve or nozzle to give an aerosol mist at a pressure of about 0 to about 400 and melt temperatures of about 500° F. to about 750° F. The total residence time in the reactor being about 0.1 to about 20 seconds. The polymer is then injected onto the screws of a twin screw reactor. The residence time in the extruder is about 45 seconds to about 3 minutes.

The preferred polymers manufactured by our process are the polyamides prepared from hexamethylene diamine and terephthalic acid, isophthalic acid and adipic acid in the mole ratio of about 100:65:25:10; to about 100:85:5:10; and the polyamides which are prepared from hexamethylene diamine, terephthalic acid and isophthalic acid in the mole ratio of about 100:30:70 to about 100:90:10.

These polyamides, polyamide-imides and polyimides prepared by the novel process described herein are used as replacements for metals in engineering applications, and therefore, they are molded and usually filled with reinforcing materials. For other applications fibers and laminates are also prepared from the polymers manufactured using our novel process.

Injection molding of the novel polymers produced by the novel process is accomplished by injecting the polymer into a mold maintained at a temperature of about 250° F. to about 500° F. In this process a 0.1–2.0 minute cycle is used with a barrel temperature of about 500° F. to about 700° F. The injection molding conditions are given in Table 1.

TABLE 1

| | |
|---|---|
| Mold Temperature | 250–580° F. |
| Injection Pressure | 2,000 to 40,000 psi and held for 0.5–20 seconds |
| Back Pressure | 0–400 psi |
| Cycle Time | 6–120 seconds |

TABLE 1-continued

| Extruder | |
|---|---|
| Nozzle Temperature | 500° F. to 700° F. |
| Barrel Temperature | 500° F. to 700° F. |
| Screw | 10-20 revolutions/minute |

We have found that the novel polyamides, polyamideimides and polyimides prepared by our novel process are improved by the addition of reinforcing material, particularly the mechanical properties of the polymers are improved if these polymers contain from about 10 to about 60% by weight glass fibers, glass beads, or graphite or mixtures thereof. The preferred range is about 30 to about 40%. Suitable reinforcing materials are glass fibers, glass beads, glass spheres and glass fabrics. The glass fibers are made of alkali-free boron-silicate glass or alkali containing C-glass. The thickness of the glass fiber is suitably on the average between 3 mm and 30 mm. The length of the glass fiber is not critical and both long and short glass fibers are suitable. Long fibers have an average length of from 5 mm to 55 mm and short fibers have an average filament length from about 0.05 mm to about 5 mm. Any standard commercial-grade fibers, especially glass fiber, may be used to reinforce our polymers. Glass beads ranging from about 5 mm to about 50 mm in diameter may also be used as a reinforcing material.

The reinforced polymers may be prepared in various ways. For example, so-called roving endless glass fiber strands are coated with the polymer and subsequently granulated. The cut fibers or the glass beads may also be mixed with the soluble polymer and heated to form the reinforced polymer. Injection molding of the reinforced polymers is carried out in the same manner as shown in Table 1.

The following examples illustrate the preferred embodiments of the invention. It will be understood that the examples are for illustrative purposes only and do not purport to be wholly definitive with respect to conditions or scope of the invention.

GENERAL PROCEDURE

The salt is prepared as follows: diacid and diamine monomers are charged to a batch reactor with a pitched blade turbine and of suitable temperature and pressure ratings to provide a homogeneous salt solution. This is typically 425° F. to 450° F. and 450 to 550 psig. Additional components including water, catalyst, silicone oil, end capping reagent, and plasticizer are also introduced in the salt reactor. Water content of the salt can range to 25% by weight. The preferred range is about 13 to 17% by weight.

The salt is metered through a pump and pressure is increased to 1500-5000 psig. The resulting prepolymer then passes through a preheat zone where temperature is raised from about 425° F. to about 450° F. to about 550° F. to about 625° F. The total residence time here is 25 to 50 seconds. The resulting prepolymer is then flashed through a control valve to give an aerosol mist at pressure of 0-400 psig and the polymer is then passed through a tubular flash reactor. This reactor is designed to provide a high heat flux to the polymer and has a wall temperature of about 650° F. to about 1000° F., melt temperature range is about 500° F. to about 750° F. through the flash reactor. The total residence time in the reactor is about 0.1 to about 20 seconds based on feed rate and pressure and this is indicated for each example, Examples 1 through 20. (The inherent viscosity (I.V.) is measured in 60/40 phenol tetrachloroethane at 30° C.)

The polymer is injected directly on the screws of the twin screw reactor and the results are given in Examples 1 through 14 under appreciated molecular weight.

Examples 1 through 14 were prepared as described in General Procedure but specific details and results are noted for each Example hereinbelow:

EXAMPLE 1

Monomers:
  10% hexamethylene diammonium adipate
  65% hexamethylene diammonium terephthalate
  25% hexamethylene diammonium isophthalate
Water Content: 15% (by weight)
Procedure: The diacids, diamines and water were charged to the salt reactor of room temperature. The initial charge totaled 36 lb (50 g/moles). Additional charges were 7.2 lbs (10 g/moles) each and were fed through lock hoppers as the salt reactor was operated in a fed batch mode. The salt reactor was a 5 gallon stirred tank reactor with a pitched blade turbine, oil jacket, variable speed drive and internal coils.

Once the salt reactor had been changed, it was purged with inert gas and heated to 425° F. (218° C.). The pressure was set to 480 psig by first allowing the water in the salt to reach its equilibrium pressure and then adjusting with inert gas. In the fed batch operations, the salt saw a range of residence times. They averaged about 100 minutes. Also as a result of the fed batch mode of operation, it was necessary to include a second surge vessel in the salt preparation section. This vessel, which was at 425° F. (218° C.) and 450 psig, was used to isolate the salt reactor during charge addition.

Upon leaving the salt section, the salt was passed through a 140 micron filter into a two headed positive displacement pump. Temperature through the pump were maintained at 425° F. (218° C.) Pressures were increased to 1800 psig in the pump. Following the pump, the salt solution was passed through a preheat zone and heated to 600° F. (316° C.). The pressure prevented vapor formation in the preheater. Residence time in the preheater was 40 seconds.

The salt entered the flash reactor through a research control valve where pressure was reduced from 1800 psig to 400 psig. Wall temperature in the flash reactor were kept at 750° F. (399° C.) using electrical heaters but the melt temperature ranged from 525° F. (274° C.) to 612° F. (322° C.) depending on location in the flash reactor. Pressure in the flash reactor was controlled by a second RCV. Residence time in the flash reactor was estimated at 7.6 seconds. The run had a 141 lb/hr-in$^2$ specific mass feed rate per unit of cross sectional area.

After leaving the flash reactor, our prepolymer had an inherent viscosity (Phenol/TCE) of 0.20 to 0.24 dl/g. It was injected directly onto the screws of the extruder. An open screw design was used to facilitate vapor removal. A screw speed of 200 rpm was used to maintain minimum fill on the screws. Temperatures were 620° F. (327° C.) in the injection zone but they were dropped gradually to 600° F. (316° C.) at the die head. Following the extruder, the polymer strand was passed through a water bath and then pelletized. The mean product I.V. was 1.20 dl/g with a standard deviation of 0.09 dl/g over the 6-hour run. Total production was 64 lbs of polymer.

EXAMPLE 2

Monomers:
  10% hexamethylene diammonium adipate
  75% hexamethylene diammonium terephthalate
  25% hexamethylene diammonium isophthalate
Water Content: 15% (by weight)
Specific Mass 149 lb/hr-in$^2$
Flow:
Residence time:
  Salt reactor—90 minutes
  Preheat zone—36 seconds
  Reactor zone—1.7 seconds
Reactor Wall Temp: 700° F. Pressure: 100 psig
Melt Temp: 584° F. to 642° F.
Product I.V. (Phenol/TCE) Tube 0.40 dl/g ZSK 1.20 dl/g

EXAMPLE 3

Monomers:
  85% hexamethylene diammonium terephthalate
  15% hexamethylene diammonium isophthalate
Water Content: 15% (by weight)
Specific Mass 156 lb/hr-in$^2$
Flow:
Residence time:
  Salt reactor—90 minutes
  Preheat zone—36 seconds
  Reactor zone—1.7 seconds
Reactor Wall Temp: 700° F. Pressure: 100 psig
Melt Temp: 580° F. to 660° F.
Product I.V. Tube 0.40 dl/g ZSK 1.0 dl/g

EXAMPLE 4

Monomers:
  100% hexamethylene diammonium adipate
Water Content: 15% (by weight)
Residence time:
  Salt reactor—90 minutes
  Preheat zone—36 seconds
  Reactor zone—1.7 seconds
Product I.V. Tube 0.40 dl/g ZSK 1.2 dl/g

EXAMPLE 5

Monomers:
  82% hexamethylene diammonium terephthalate
  14% hexamethylene diammonium isophthalate
  3% trimethyl hexamethylene diammonium terephthalate
  1% trimethyl hexamethylene diammonium isophthalate
Water Content: 17% (by weight)
Specific Mass 149 lb/hr-in$^2$
Flow:
Residence time:
  Salt reactor—100 minutes
  Preheat zone—40 seconds
  Reactor zone—2 seconds (est.)
Reactor Wall Temp.: 760° F. Pressure: 100 psig
Melt Temp: 570° F. to 650° F.
Salt Feed Temp: 580° F.
Product I.V. (Phenol/TCE) Tube 0.20 dl/g ZSK 1.00 dl/g

EXAMPLE 6

Monomers:
  65% hexamethylene diammonium terephthalate
  15% hexamethylene diammonium isophthalate
  10% hexamethylene diammonium adipate
  10% amic acid adduct (TMA, HMDA)
Water Content: 15% (by weight)
Specific Mass 141 lb/hr-in$^2$
Flow:
Residence time:
  Salt reactor—100 minutes
  Preheat zone—40 seconds
  Reactor zone—5 seconds (est.)
Reactor Wall Temp: 750° F. Pressure: 200 psig
Melt Temp: 525° F. to 640° F.
Salt Feed Temp: 620° F.
Product I.V. (Phenol/TCE) Tube 0.20 dl/g ZSK 1.01 dl/g

EXAMPLE 7

Monomers:
  8% hexamethylene diammonium adipate
  2% M-phenylene diammonium adipate
  49% hexamethylene diammonium terephthalate
  16% M-phenylene diammonium terephthalate
  11% hexamethylene diammonium isophthalate
  4% M-phenylene diammonium isophthalate
  8% amic acid adduct (TMA, HMDA)
  2% amic acid adduct (TMA, M-phenylene diamine)
Water Content: 13% (by weight)
Specific Mass: 149 lb/hr-in$^2$
Residence time:
  Salt reactor—100 minutes
  Preheat zone—40 seconds
  Reactor zone—2 seconds (est.)
Reactor Wall Temp: 750° F. Pressure: 100 psig
Melt Temp: 550° F. to 640° F.
Salt Feed Temp: 585° F.
Product I.V. (Phenol/TCE) Tube 0.21 dl/g

EXAMPLE 8

Monomers:
  50% hexamethylene diammonium isophthalate
  50% M-phenylene diammonium isophthalate
Water Content: 13% (by weight)
Specific Mass 158 lb/hr-in$^2$
Flow:
Residence time:
  Salt reactor—100 minutes
  Preheat zone—40 seconds
  Reactor zone—2 seconds (est.)
Reactor Wall Temp: 750° F. Pressure: 100 psig
Melt Temp: 590° F. to 710° F.
Salt Feed Temp: 600° F.
Product I.V. (Phenol/TCE) Tube 0.16 dl/g

EXAMPLE 9

Monomers:
  25% hexamethylene diammonium isophthalate
  25% M-phenylene diammonium isophthalate
  25% amic acid adduct (TMA, HMDA)
  25% amic acid adduct (TMA, M-phenylene diamine)
Water Content: 13% (by weight)
Specific Mass 158 lb/hr-in$^2$
Flow:
Residence time:
  Salt reactor—100 minutes
  Preheat zone—40 seconds
  Reactor zone—2 seconds (est.)
Product I.V. (Phenol/TCE) Tube 0.15 dl/g

EXAMPLE 10

Monomers:
  50% M-phenylene diammonium isophthalate
  50% amic acid adduct (TMA, M-phenylene diamine)
Water Content: 13% (by weight)
Specific Mass 158 lb/hr-in$^2$
Flow:
Residence time:
  Salt reactor—100 minutes
  Preheat zone—40 seconds
  Reactor zone—2 seconds (est.)
Reactor Wall Temp.: 785° F. Pressure: 100 psig
Melt Temp: 600° F. to 700° F.
Salt Feed Temp: 600° F.
Product I.V. (NMP) Tube 0.14 dl/g Solid State 0.45 dl/g

EXAMPLE 11

Monomers:
  100% M-phenylene diammonium isophthalate
Water Content: 21% (by weight)
Specific Mass 124 lb/hr-in$^2$
Flow:
Residence time:
  Salt reactor—100 minutes
  Preheat zone—40 seconds
  Reactor zone—1 second (est.)
Reactor Wall Temp: 850° F. Pressure: 50 psig
Melt Temp: 525° F. to 800° F.
Salt Feed Temp: 630° F.
Product I.V. (NMP) Tube 0.13 dl/g ZSK 0.35 dl/g

EXAMPLE 12

Monomers:
  49% hexamethylene diammonium terephthalate
  21% hexamethylene diammonium isophthalate
  21% M-phenylene diammonium terephthalate
  9% M-phenylene diammonium isophthalate
Water Content: 13% (by weight)
Specific Mass 124 lb/hr-in$^2$
Flow:
Reactor Wall Temp: 690° F. Pressure: 100 psig
Melt Temp: 460° F. to 620° F.
Salt Feed Temp: 600° F.
Product I.V. (Phenol/TCE) Tube 0.16 dl/g ZSK 1.00 dl/g

EXAMPLE 13

Monomers:
  49% hexamethylene diammonium terephthalate
  21% hexamethylene diammonium isophthalate
  21% trimethylhexamethylene diammonium terephthalate
  9% trimethylhexamethylene diammonium terephthalate
Water Content: 13% (by weight)
Specific Mass 124 lb/hr-in$^2$
Flow:
Residence time:
  Salt reactor—100 minutes
  Preheat zone—40 seconds
  Reactor zone—2 seconds (est.)
Reactor Wall Temp: 650° F. Pressure: 100 psig
Melt Temp: 530° F. to 640° F.
Salt Feed Temp: 630° F.
Product I.V. (Phenol/TCE) Tube 0.24 dl/g ZSK 1.00 dl/g

EXAMPLE 14

Monomers:
  40% hexamethylene diammonium terephthalate
  60% hexamethylene diammonium isophthalate
Water Content: 17% (by weight)
Specific Mass 137 lb/hr-in$^2$
Flow:
Residence time:
  Salt reactor—100 minutes
  Preheat zone—50 seconds
  Reactor zone—2 seconds (est.)
Reactor Wall Temp: 650° F. Pressure: 100 psig
Melt Temp: 525° F. to 630° F.
Salt Feed Temp: 625° F. Product I.V. (Phenol/TCE) ZSK 1.14 dl/g

We claim:

1. A process for manufacture of polyamide-imide which process comprises combining components comprising metaphenylene diamine, trimellitic anhydride and isophthalic acid in a mole ratio of about 100:10:90 to 100:50:50 and aqueous solvent at a temperature of about 300° F. to about 500° F. to form a solution comprising salts of metaphenylene diamine and trimellitic anhydride and of metaphenylene diamine and isophthalic acid, provided the solvent content of the solution is below 25% by weight, pressurizing the solution to about 1500 to about 3000 psig, passing said solution through a preheat zone where the temperature of said solution is increased to between about 550° F. and about 625° F. during a residence time in the preheat zone of about 25 to about 50 seconds, flashing said solution through a control means at a pressure of about 0 to about 400 psig to give an aerosol mist of reactants comprising said salts, polymerizing said reactants while passing said aerosol mist through a flash reactor with wall temperatures of about 600° F. to about 1000° F., and maintaining a residence time of said reactants in the reactor at about 0.1 second to about 20 seconds.

2. The process of claim 1 wherein said solvent is water.

3. A process for manufacture of polyamide-imide comprising atomizing components comprising an aqueous solution of salt obtained from feed materials comprising at least one tricarboxylic acid or an anhydride thereof and at least one diamine at a pressure of about 0 to about 400 psig to form an aerosol mist of reactants comprising salt, polymerizing said reactants while passing said aerosol mist through a flash reactor having wall temperatures of about 400° F. to about 1,000° F. for about 0.1 second to about 20 seconds to produce the polyamide-imide.

4. The process of claim 3 wherein said solvent is water.

5. The process of claim 3 wherein said diamine is selected from the group consisting of methylenebis(aniline), hexamethylene diamine, meta-phenylene diamine, and oxybis(aniline), and said tricarboxylic acid is trimellitic acid, and said anhydride is trimellitic anhydride.

6. A process for manufacture of polyimide which process comprises combining components comprising an aliphatic or aromatic diamine or a mixture of these, at least one tetracarboxylic acid or an anhydride thereof and aqueous solvent at a temperature of about 300° F. to about 500° F. to form a solution comprising a salt of the diamine or mixture thereof and acid or anhydride, provided the solvent content of the solution is below 25% by weight, pressurizing said solution to a pressure of about 1500 to about 3000 psig and then passing said solution through a preheat zone where the temperature of said solution is increased to between about 550° F. and about 625° F. during a residence time in the preheat zone of about 25 to about 50 seconds, flashing said solution through a control means at a pressure of about 0 to about 400 psig to give an aerosol mist of reactants comprising said salt, polymerizing said reactants while passing said aerosol mist through a flash reactor with wall temperatures of about 600° F. to about 1,000° F., and maintaining a total residence time of said reactants in the reactor at about 0.1 second to about 20 seconds.

7. The process of claim 6 wherein said solvent medium is water.

8. A process for manufacture of polyimide comprising atomizing components comprising an aqueous solution of salt obtained from feed materials comprising at least one tetracarboxylic acid or an anhydride thereof and at least one diamine at a pressure of about 0 to about 400 psig to form an aerosol mist of reactants comprising said salt, polymerizing said reactants while passing said aerosol mist through a flash reactor having wall temperatures of about 400° F. to about 1,000° F. for about 0.1 second to about 20 seconds to produce the polyimide.

9. A process for the manufacture of a polyamideimide which process comprises combining components comprising an aliphatic or aromatic diamine or a mixture of these, at least one tricarboxylic acid or an anhydride thereof, and aqueous solvent at a temperature of about 300° F. to about 500° F. to form a solution comprising a salt of the diamine or mixture thereof and the acid or anhydride, provided the solvent content of the solution is below 25% by weight, pressurizing said solution to a pressure of about 1500 to about 3000 psig and then passing said solution through a preheat zone where the temperature of said solution is increased to between about 550° F. and about 625° F., maintaining the solution in the preheat zone for about 25 to about 50 seconds, flashing the solution through a control means at a pressure of about 0 to about 400 psig to give an aerosol mist of reactants comprising said salt, polymerizing said reactants while passing said aerosol mist through a flash reactor with wall temperatures of about 600° F. to about 1000° F., and maintaining a total residence time of said reactants in the reactor at about 0.1 second to about 20 seconds.

10. The process of claim 9 wherein said solvent is water.

11. The process of claim 9 wherein said diamine is selected from the group consisting of hexamethylene diamine, methylenebis(aniline), meta-phenylene diamine, and oxybis(aniline), said tricarboxylic acid is trimellitic acid and said anhydride is trimellitic anhydride.

12. The process of claim 9 wherein the process is continuous.

13. A process for the manufacture of a polyamideimide or polyimide which process comprises combining components comprising aqueous solvent, an aliphatic or aromatic diamine or a mixture of these, and, in the case of polyamide-imide manufacture, at least one tricarboxylic acid or an anhydride thereof or, in the case of polyimide manufacture, at least one tetracarboxylic acid or an anhydride thereof, at a temperature of about 300° F. to about 500° F. to form a solution comprising a salt of the diamine or mixture thereof and the acid or anhydride, provided the solvent content of the solution is below 25% by weight, pressurizing said solution to a pressure of about 1500 to about 3000 psig and then passing said solution through a preheat zone where the temperature of said solution is increased to between about 550° F. and about 625° F., maintaining the solution in the preheat zone for about 25 to about 50 seconds, flashing the solution through a control means at a pressure of about 0 to about 400 psig to give an aerosol mist of reactants comprising said salt, polymerizing said reactants while passing said aerosol mist through a flash reactor with wall temperatures of about 600° F. to about 1000° F., and maintaining a total residence time of said reactants in the reactor at about 0.1 second to about 20 seconds.

14. A process for manufacture of polyamide-imide or polyimide comprising atomizing components comprising an aqueous solution of salt obtained from feed materials comprising at least one diamine and, in the case of polyamide-imide manufacture, at least one tricarboxylic acid or an anhydride thereof, or in the case of polyimide manufacture, at least one tetracarboxylic acid or an anhydride thereof, at a pressure of about 0 to about 400 psig to form an aerosol mist of reactants comprising said salt, polymerizing said reactants while passing said aerosol mist through a flash reactor having wall temperatures of about 400° F. to about 1000° F. for about 0.1 second to about 20 seconds to produce the polyamide-imide or polyimide.

* * * * *